Oct. 9, 1928.
H. A. BUCKERT ET AL
1,686,896
AUTOMOBILE CREEPER
Filed Feb. 2, 1927
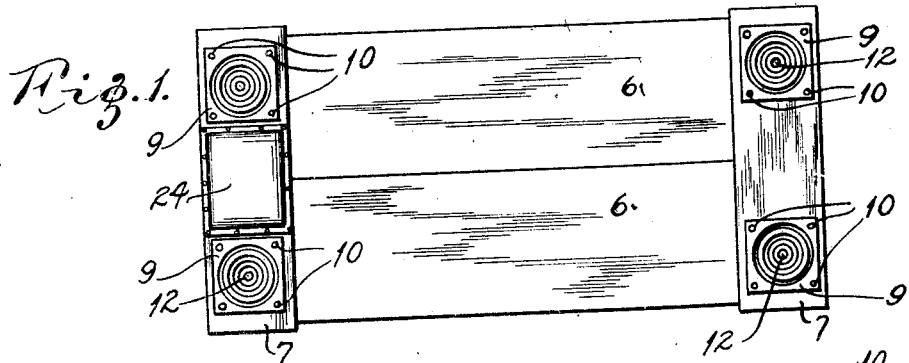
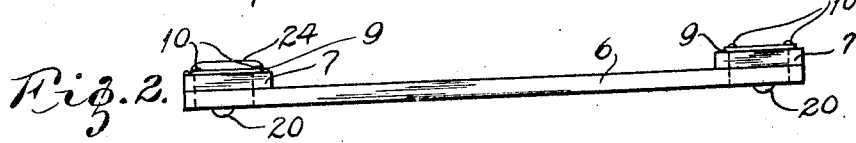
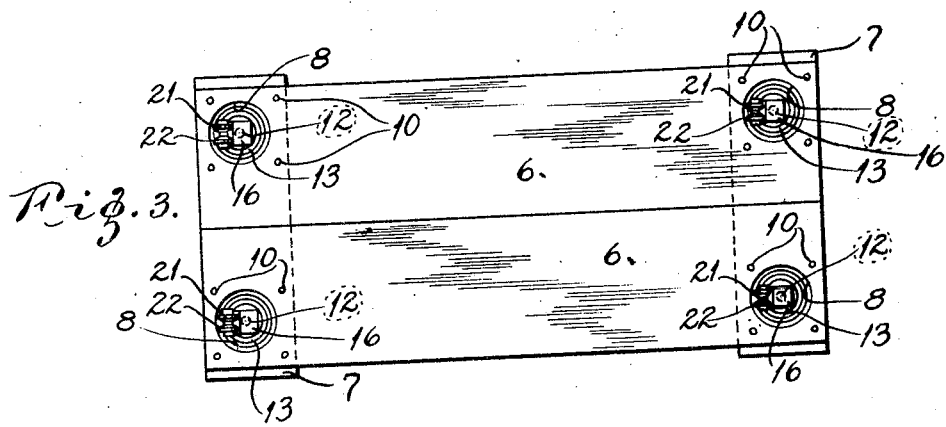
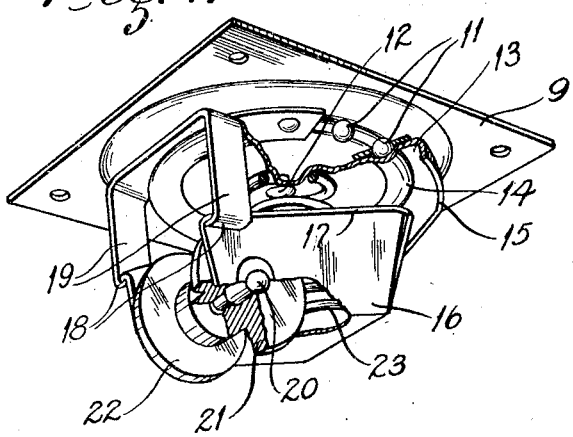
INVENTORS
HOMER A. BUCKERT
EARL K. HALL
By Edward E. Longan
ATTORNEY Patented Oct. 9, 1928.

1,686,896

UNITED STATES PATENT OFFICE.

HOMER A. BUCKERT, OF ST. LOUIS, AND EARL K. HALL, OF UNIVERSITY CITY, MISSOURI.

AUTOMOBILE CREEPER.

Application filed February 2, 1927. Serial No. 165,306.

Our invention relates to improvements in automobile creepers, and has for its primary object an automobile creeper which is so constructed as to be practically indestructible. In other words, the creeper is provided with rollers which, when weight in excess of a predetermined amount is placed on the creeper, the rollers will recede into the creeper permitting it to sink to the floor.

A further object is to construct a creeper which is so arranged that when excess weight is placed thereon, it will sink down to the floor and lie smoothly thereon. This makes our device especially useful in garages as it frequently happens that the mechanic forgets to remove the creeper and a motor vehicle will pass thereover. Then if the creeper is maintained rigidly at a point above the floor either the creeper will be broken or one or more of its roller supports destroyed.

Another feature of our device is that it is very close to the floor thereby permitting a mechanic to get underneath a car much more readily than where the distance from the floor to the top of the creeper is greater. This is especially important as the tendency in the construction of motor vehicles is to bring the bodies closer to the ground thereby reducing the space beneath the vehicle into which the mechanic must get to work on the car.

A still further object is to construct an automobile creeper in which the roller supports are so arranged that they will readily pass over cracks or ridges on the floor.

The rollers are also arranged in sections as illustrated in Fig. 4 so that, when the roller is swiveled, one portion can rotate faster than the other thereby eliminating sliding over the floor. In other words, the roller has a two point bearing on the floor and consequently is supported against any tilting tendency. In other words, we get all the advantages of a wide roller without the increased friction on the floor surface tending to flatten or wear the contact surface of a wide roller thereby eliminating flat spots and surface wear.

In the drawings:

Fig. 1 is a top plan view of our device;

Fig. 2 is a side elevation of the same;

Fig. 3 is a bottom plan view; and

Fig. 4 is a fragmental perspective of one of the rollers employed.

In the construction of our device, we employ a body portion composed of a plurality of boards 6, which are placed with their adjacent edges close together so as to form an unbroken surface. Secured to the upper faces of the boards and at each end thereof are cleats 7. These cleats project beyond the outside edges of the body portion so as to afford a hand-hold and permit the device to be readily picked up.

Extending through the boards 6 and cleats 7 are circular openings 8, which form recesses for the casters. Secured to the upper face of the cleats 7 are plates 9, which are secured by means of rivets 10. Each plate 9 is provided with circular corrugations, one of which acts as a race for the bearing balls 11.

Pivotally secured to the underside of each plate 9 by means of a rivet 12 is a plate 13, which is provided with a circular corrugation 14, and which also acts as a race for the bearing balls 11. The plate 13 is provided with a downturned portion 15 to which is pivotally attached at one end a housing 16. This housing has its upper longitudinal edges 17 outturned, which edges are adapted to engage with the hooked ends 18 of arms 19, which are also formed integral with the plate 13.

Pivotally carried by the housing 16 is a shaft 20 on which is mounted the roller support, which is composed of sections 21 and 22. These sections are reduced at their adjacent or contacting ends so that only the outer ends of the rollers will have bearing with the floor and, by reason of being made in sections when the caster is swiveled, one section can rotate faster than the other. Located within the housing 16 is a resilient member 23, which is preferably a coil spring, one end of which bears against the bottom of the housing while the opposite end bears against the plate 13. In this manner the caster or roller is held normally in the position shown in Fig. 4, the hooked ends of the arms 19 limiting the downward movement of the roller by engaging with the flange 17 of the housing 16 but these hooked ends in no way interfering with the upward movement or receding of the casters.

In order to make the device more comfortable for the operator, a head rest 24 is secured to one of the cleats. This head rest is preferably in the form of a cushion. It is to be understood, of course, that the resilient member or spring 23 is of such tension that it will support the weight of an ordinary mechanic without causing the rollers to recede but, however, should the device remain on the floor of the garage and in the path of travel of a motor vehicle, the vehicle passing over the board or creeper will cause the rollers to recede and permit the boards 6, which compose the body, to rest flat upon the floor thereby preventing all possibility of these boards becoming broken. It is this feature which makes our device practically indestructible.

Having fully described our invention, what we claim is:—

1. An automobile creeper comprising a body portion having recesses in its underneath surface, swiveling rollers carried by said body portion and located in said recesses for supporting the same, and means for resiliently supporting said rollers so that the same can recede into said recesses and the entire body portion rest flat on a floor when said body portion is subjected to a weight in excess of a predetermined amount and again be automatically raised to its original position when said excess weight is removed.

2. An automobile creeper comprising a rectangular body portion having a recess adjacent each corner in its underneath surface, a resiliently mounted roller located in each of said recesses and normally projecting beyond the underneath surface of said body portion carried thereby, said rollers being so mounted that the addition of weight above a predetermined amount will cause said rollers to move upward and permit the entire body portion to rest flat on a floor.

3. An automobile creeper comprising an elongated rectangular flat body portion having a recess adjacent each corner in its underneath surface, yieldingly mounted roller supporting means secured to said body portion within said recesses, said rollers adapted to pass upward into said recesses so that said body portion will contact with a floor or other support throughout its underneath surface when excess weight is applied thereto.

4. An automobile creeper comprising a body portion, having recesses in its underneath surface, swivel roller supports resiliently mounted on said body portion within said recesses and normally projecting beyond the underneath surface of said body portion so that the same is free to move whereby when excess weight is imposed on the body portion, the entire body portion is forced flat against a supporting surface.

5. An automobile creeper comprising a body portion having openings therethrough, cleats secured to the upper face of said body portion over said recesses, swiveling rollers located in said recesses and resiliently carried by said cleats and normally projecting beyond the under face of said body portion, said rollers adapted to move upward into said recesses when excess weight is placed on said body portion whereby said body portion can rest flat on a floor.

6. An automobile creeper comprising a body portion having bores extending vertically therethrough, plates carried by said body portion on its upper surface for closing said bores, swiveling casters having sectional rollers carried by said plates and within said bores, resilient means for normally projecting said rollers below the underneath surface of said body portion, said resilient means adapted to permit said rollers to pass upward into said bores when weight in excess of a predetermined amount is placed on said body portion whereby damage to said body portion and said casters is prevented, and means for limiting the amount of projection of said rollers.

In testimony whereof we have affixed our signatures.

HOMER A. BUCKERT.
EARL K. HALL.